United States Patent [19]

Michie

[11] Patent Number: 5,142,102
[45] Date of Patent: Aug. 25, 1992

[54] MULTIPLE TIER JUNCTION BOX

[75] Inventor: Alexander Michie, Coquitlam, Canada

[73] Assignee: Pacific Rim Polytech Corp., Burnaby, Canada

[21] Appl. No.: 623,153

[22] Filed: Dec. 6, 1990

[51] Int. Cl.⁵ .............................................. H02G 3/08
[52] U.S. Cl. ......................................... 174/50; 174/37; 174/57
[58] Field of Search ................... 174/37, 48, 50, 53, 174/57

[56] References Cited

U.S. PATENT DOCUMENTS

| | | | |
|---|---|---|---|
| 3,115,539 | 12/1963 | Stuessel et al. | 174/48 |
| 3,346,230 | 10/1967 | Tolf, Jr. | 174/37 X |
| 3,701,837 | 9/1972 | Fork | 174/50 |
| 3,873,757 | 3/1975 | Berke et al. | 174/52 R |
| 3,911,635 | 9/1975 | Traupe | 52/221 |
| 4,059,199 | 11/1977 | Quaney | 174/66 X |
| 4,591,656 | 5/1986 | Mohr | 174/48 |
| 4,916,258 | 4/1990 | Mohr | 174/48 |
| 5,008,491 | 4/1991 | Bowman | 174/48 |

FOREIGN PATENT DOCUMENTS

| | | |
|---|---|---|
| 528475 | 7/1956 | Canada . |
| 656567 | 1/1963 | Canada . |
| 673746 | 11/1963 | Canada . |
| 765970 | 8/1967 | Canada . |
| 767295 | 9/1967 | Canada . |
| 908825 | 8/1972 | Canada . |
| 989053 | 5/1976 | Canada . |
| 990843 | 6/1976 | Canada . |
| 1185668 | 4/1985 | Canada . |
| 1185688 | 4/1985 | Canada . |

*Primary Examiner*—Leo P. Picard
*Assistant Examiner*—David A. Tone
*Attorney, Agent, or Firm*—McFadden, Fincham, Marcus & Anissimoff

[57] ABSTRACT

There is disclosed an electrical junction box having a plurality of tiers each of which increases in cross-sectional area from the top of the box to the bottom thereof. The tiers, being annular are adapted to receive conduits from a plurality of angles or levels. A releasably engageable lid covers the box which may be mounted to or within a substrate by a mounting member integral with the junction box.

23 Claims, 2 Drawing Sheets

MULTIPLE TIER JUNCTION BOX

FIELD OF THE INVENTION

The present invention relates to junction boxes, more particularly it relates to a multi-tiered junction box which can accommodate a plurality of conduits from a variety of different levelled tiers on angles thereon.

BACKGROUND OF THE INVENTION

Generally, electrical junction boxes are well known in the art. Such boxes are used in residential, industrial and commercial installations and in such instances, are of a relatively small size e.g. 4" in diameter and 1" to 3" in depth. They are normally placed in ceilings, walls, flooring, etc. to receive spliced conduits, valved conduits and other joints. Several examples of this type of junction box are known in the art as exemplified by U.S. Pat. Nos. 3,873,757 and 4,916,258, as well as Canadian Patent Nos. 765,295, 908,825, 528,475 and 1,185,668.

Junction boxes are also used in major installations in underground construction, where large cables are joined for high voltage lines. In such cases, the junction boxes are many times the size of the above type and may, for example, be 2' to 4' in diameter and 1' to 4' high. In the latter case, the construction and structural characteristics required for such junction boxes are significantly different than the small residential or like installations. Where such junction boxes are used exteriorly, they may be buried in the ground or mounted on a slab construction which is subsequently covered with earth, sand or the like. In addition to other factors, such junction boxes must obviously meet requirements for exposure to outdoor criteria e.g. water resistance, etc.

In the case of outdoor junction boxes, for large electrical installations, one possibility has been to construct a fixed enclosure of suitable material e.g. concrete, metal housings or the like. Apart from the cost effectiveness of such construction, there are also other considerations such as transportation, installation, etc. which add to the total economic factor for such apparatus.

It would be desirable if there could be provided a junction box structure and apparatus which can readily be mounted exteriorly, as well as one which can be useful for interior installation, and which can be manufactured in an economic and simple manner while at the same time providing a unit which can be readily secured in place under different locations and circumstances.

Conventionally the known junction boxes include clamps to fasten a cable therein entering the box. Typically, the boxes include "knockouts" to permit reception of a conduit within the box. Further, the known junction boxes comprise an electroconductive material which requires that electrical conduits be grounded thereto.

SUMMARY OF THE INVENTION

The present invention provides a junction box adapted for mounting to or within a substrate.

Applicant, in one aspect of the invention, provides a multi-tiered integrally molded junction box. The tiers are preferably circular and increase in cross-sectional area from the top of the junction box to the bottom.

The box is preferably molded from a rigid material, e.g. a polyelastomer to provide a non-electroconductive housing which may be apertured by drilling, etc This material, in combination with the multiple circular tiered structure allows a plurality of conduits to enter the box via apertures provided by the user from a variety of angles and tiers. Further, the tiers may be cut, etc. for different applications, e.g. variable level terrain, underground applications, etc.

According to another aspect of the present invention, there is provided mounting means for mounting the junction box to or within a substrate. In one form, the mounting means includes a circular wall extending outwardly and spaced from a bottom tier. Spacer means between the wall and the lowest tier impart structural integrity to the wall. A base wall extending between the circular wall and the lowest tier cooperates with the spacer means to provide an open top mounting means. This arrangement stabilizes the box when positioned within a substrate.

According to a further aspect of the invention, there is provided integrally molded reinforcement means extending vertically down the integral periphery of the box. Since the reinforcing means are molded with the box, removal of one or some of the tiers will not affect the reinforcing capability for the remaining tiers.

In a further aspect of the present invention, Applicant provides a lower member having engaging means for cooperation with cover receiving means associated with the junction box. The cover, as in the junction box, includes reinforcing means.

In a further aspect of the present invention, the junction box may be turned upside down with the mounting means facing upward. Means for interconnection with another similarly disposed box allows the two to be superposed. As such, the assembled boxes have been found to function effectively as a manhole.

According to a particularly preferred aspect of the present invention, there is provided a junction box adapted for connection of one or more electrical members, the improvement wherein the junction box comprises a hollow body having a plurality of tiers, the tiers comprising a plurality of diverging stages, each of the tiers having a cross-sectional area greater than a preceding stage and less than a succeeding stage.

In an alternate form, the junction box may include an adapter ring which fits around the top of the box to anchor the same for applications where cement sidewalls are being installed around the opening thus preventing any shifting. Further, the ring may be adapted to fit the junction box regardless of which tier is cut.

In another form where several boxes may be required, the boxes may include cooperating engaging means for connection with an adjacent box. Further, the boxes may be linked with a conduit integrally molded therewith for communication between a plurality of boxes.

According to further preferred features of the present invention, the junction box may be formed of a suitable thermoplastic or thermoset material and the choice of such material will depend on various factors such as location of the junction box, i.e. above or below ground, whether moisture is a consideration, etc. Typically, suitable thermoplastic materials include various types of resins such as polyolefins, e.g. polypropylenes, polyamides, such as the "nylon" polyamides, polycarbonates, etc. In addition, such resinous materials allow for the junction boxes to be produced by a simple molding technique as, for example, by injection molding. Still further, the junction box may, however, be formed of suitable metal material such as aluminum, iron, steel or the like for other specific applications by suitable techniques such as molding, casting or the like.

In accordance with the invention, the junction boxes having the multi-tiered configuration preferably have a substantially circular configuration although it will be understood that for various applications, other configurations such as oblong or oval shapes may be employed. In other cases, a polygon shaped configuration may be desirable. However, in the preferred form of the junction box, the circular shape of the junction box provides substantially greater strength for the outer walls to withstand horizontal forces, when installed in the ground, from ground pressure in order to maintain shape integrity.

The preferred configuration of a circular structure also facilitates provision of entry apertures into the junction box from any direction, for insertion of wiring or conduits. Thus, this preferred configuration is not limited as in the case of square junction boxes.

In accordance with this invention, the junction box may be provided with cover means for closing one end of the junction box, or both ends, if required. The cover means preferably has a structure corresponding to and dimensioned for the size and configuration of the opening at one or both ends of the junction box. In the case of a circular or cylindrically shaped body, a circularly shaped lid will be employed, which in turn, results in a combination having several advantages over a square shaped junction box which would employ a square shaped lid. Thus, for example, a circularly shaped lid, when subjected to downwardly exerted pressure as would result from vehicular traffic running over the top of a junction box, would result in a substantially uniformed distribution of the downward pressure about the complete junction box due to the circular lid in contrast to the pressure which would be exerted on a square shaped junction box. Still further, a circularly shaped lid cannot drop or fall into the junction box during installation of the lid, in contrast to a square shaped lid which may accidentally penetrate through the open top and fall into the interior chamber of the junction box resulting in damage.

In general, the tiered body structure preferably comprises three or more tiers although the exact number will depend on the height or overall size of the unit. Preferably between three to eight tiers are employed depending on the requirements for each application; preferably, the tiers are such that each succeeding tier, of a diverging nature, increases the cross-sectional size of the junction box by between 2% to 20% and desirably 5% to 15%.

The electrical junction box of the present invention includes means for permitting the same to be secured or anchored to a substrate; for example, when the junction box is placed on a supporting surface, in an outdoor underground installation, the locale surrounding the junction box may be backfilled with earth or suitable filling material and in order to ensure the stability and prevent the apparatus from shifting, suitable means may be associated with or form an integral part of the junction box for this purpose. To this end, the junction box may be provided with an outwardly and upwardly extending rim, preferably in the form of a coextensive wall of a generally co-planar nature, which is exteriorly located, and which is adapted to receive such fill material to position the box in place. In other embodiments, suitable brackets (one or more) or arms may project exteriorly and laterally of the lower outer wall, which may be anchored by suitable means to the substrate (e.g. by placing anchor bolts, etc. into the soil through the brackets). Still further, such anchoring means may also be located interiorly of the lower wall so that anchoring of the device may be accomplished during initial installation of the unit.

The junction box of the present invention may optionally have incorporated therein individual "knockouts" provisions and means for securing incoming and outgoing electrical connections, e.g. clamps although for most purposes, these will be separately provided where and as required.

The device of the present invention includes several advantageous features compared to prior art structures; for instance, tiering allows for the adding of strengthening gussets along the inside of the junction box. The gussets add strength to withstand horizontal sidewall forces from the earth pushing in against the junction box when it is buried. The tiering itself adds strength to withstand horizontal sidewall forces as the top of each tier adds horizontal thickness to the walls. Still further, tiering allows the top of the junction box to be smaller than the body. As the top of the junction box is at ground level, the lid can be made smaller and consequently, a smaller area is exposed at ground level.

BRIEF DESCRIPTION OF THE DRAWINGS

Having thus generally described the invention, reference will now be made to the accompanying drawings illustrating preferred embodiments and, in which.

DETAILED DESCRIPTION OF THE PREFERRED EMBODIMENTS

Figure 1:
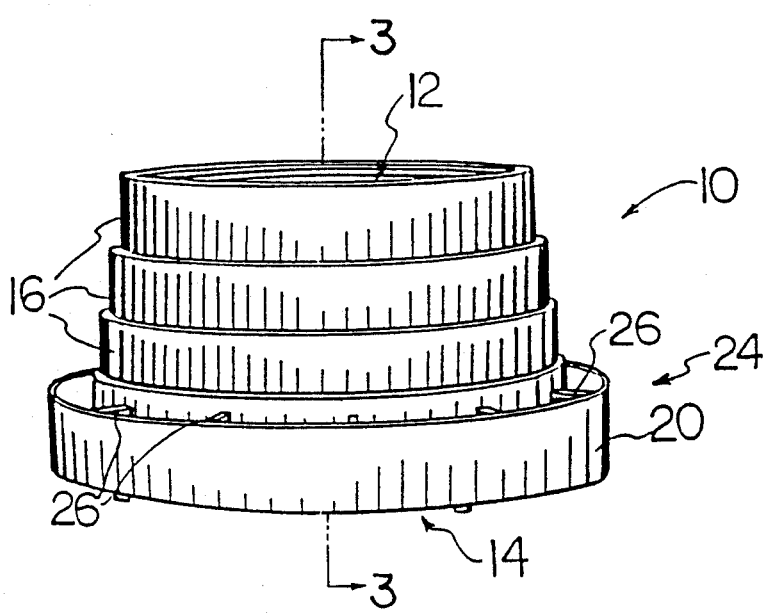
FIG. 1 is a perspective view of the present invention.

Referring to FIG. 1, shown is a perspective view of the junction box of the present invention, generally indicated by numeral 10. The box 10 has an open top 12 and open bottom 14 with a plurality of tiers preferably circular in cross-section extending therebetween. It is particularly preferred that each of the tiers 16 have a greater cross-sectional area than a preceding tier, while having a smaller cross-sectional area than a succeeding tier. In this arrangement, the tubular junction box 10 diverges from top 12 to bottom 14.

In greater detail, the bottom 14 of the box 10 preferably includes mounting means 24 for mounting the box 10 to or within a substrate, e.g. concrete, ground, etc. The mounting mean 24 includes a circular wall 20 extending outwardly from and concentrically with tier 16 adjacent bottom 14 of the junction box 10. The wall 20 is maintained in a spaced relationship from tier 16 adjacent bottom 12 by spacer means. The spacer means comprise a plurality of individual spaced apart plate members 26 preferably radiating externally from tier 16 adjacent bottom 14 and extending between this tier and wall 20. The mounting means 24 additionally provides a base member 28 integrally molded with the box 10. The base member 28 extends perpendicularly from the bottom 22 of wall 20 to the exterior of tier 16 adjacent bottom 14 to thus provide a closed bottom-open top mounting means 24.

As briefly mentioned herein, the box 10 preferably is molded using a suitable material for such a structure which houses electrical conduits, pipes, etc. Such suitable materials include polymeric substances, more particularly rigid polymers. These materials provide strength and are light weight non-electroconductive. When electrical conductivity is not a concern, e.g. for housing pipe junctions, etc. other materials such as cast aluminum, steel, etc. may be employed. By incorporating the polymeric material however, one may easily drill, for example, into the structure at any position along a tier 16 and at any selected tier.

Figure 2:
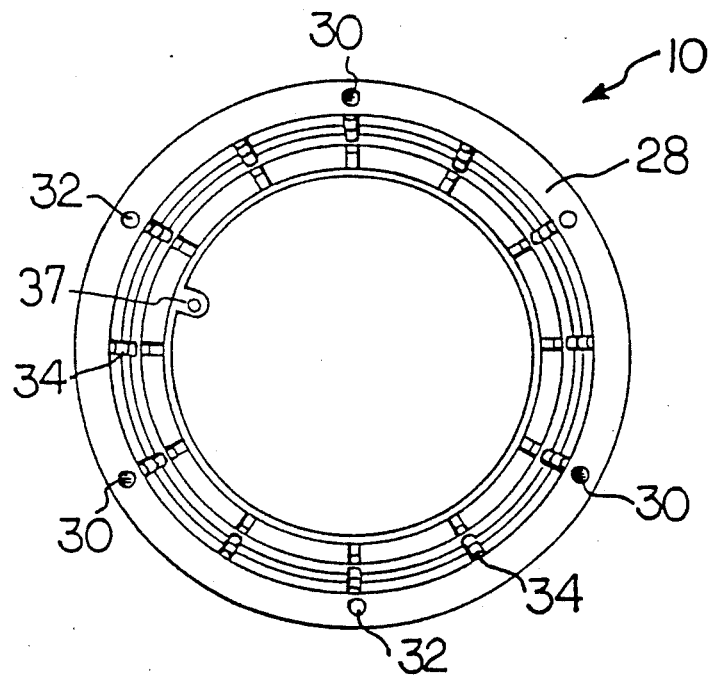
FIG. 2 is a bottom view of the junction box of the present invention.

Referring to FIG. 2, shown is a bottom view of the junction box 10.

Figure 3:
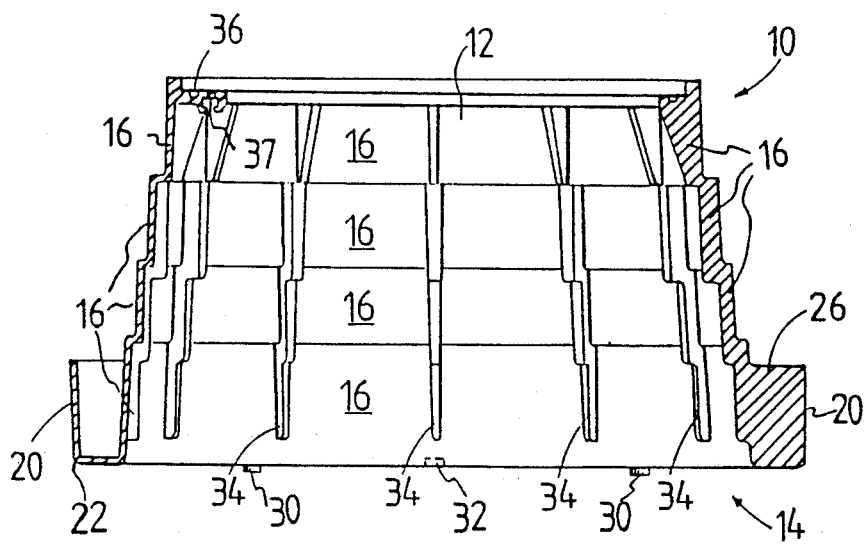
FIG. 3 is a sectional view taken along line 3—3 of FIG. 1.

The base member 28, discussed previously herein, preferably includes first engaging means 30, e.g. projections extending perpendicularly and projecting downwardly therefrom regularly spaced apart therefrom, second engaging means 32, e.g. recesses extending upwardly therein. The engaging means 30 and 32 extend about the circumference of base 28; the recesses 32 are dimensioned to frictionally engage the projections 30. Thus, the first and second engaging means 30 and 32 of one junction box 10 can engage and interlock the second and first engaging means 32 and 30 respectively of a similar base 28 of a similar junction box 10 in a superposed relationship. This allows the superposed and interlocked junction boxes to provide double the height of one individual box 10 to thus accommodate a variety of applications. Further, since the boxes diverge, as illustrated in FIG. 3, they may be stacked. The stacking allows the height of a box 10 to be increased by an amount equal to the width of the circular walls 20 of mounting means 24; the spacer means 26 located therein additionally provide support for boxes 10 stacked in this manner.

In one application, the box 10 may be situated within the ground and the open top of the mounting means filled with earth. The spacer means 26 prevent the rotation along a vertical axis of the box 10 while mounted in the ground and keep the same from rising upward from underground forces, etc. The tier 16, comprising the polymeric material previously mentioned herein, allows the same to be cut to thereby "customize" the junction box 10 to any terrain.

Applicant has found that the circular tiered structure of the box 10 adequately withstands horizontal forces externally exerted on the same while in situ. To further enhance the strength of the tiers 16, reinforcing means 34 are provided and integrally molded within the internal periphery of box 10, (preferably vertically therein) in a regularly spaced apart manner. This is shown in FIG. 3. The reinforcing means 34, being integrally molded with the box 10, thus conform to each of the tiers 16; this provides reinforcement for subsequent tiers 16 in the event one is removed, cut, etc.

Figure 5:
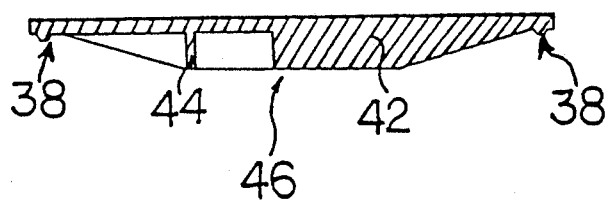
FIG. 5 is a sectional view taken along line 5—5 of FIG. 4.
Figure 4:
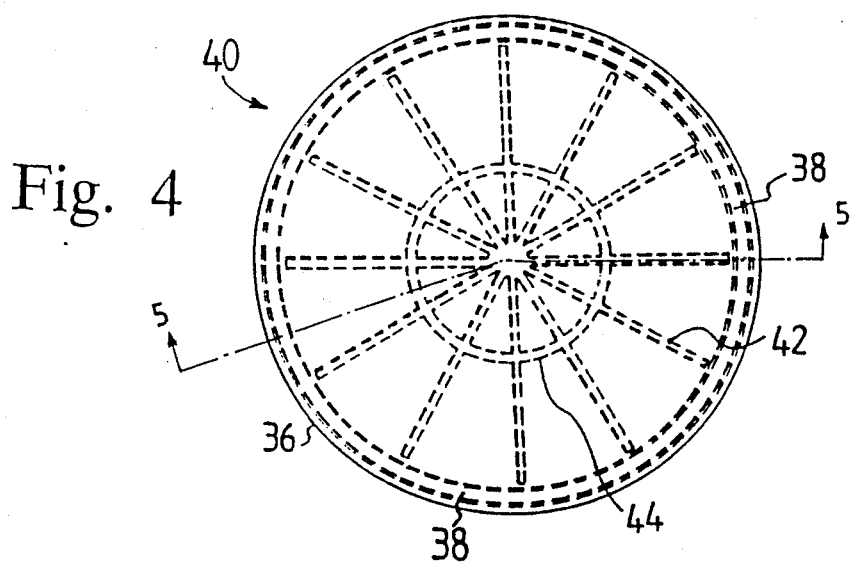
FIG. 4 is a top view of the cover member of the junction box of the present invention.

Referring back to FIG. 3, the top 12 of the box 10 preferably includes, spaced inwardly from the internal periphery cover, receiving means 36. The cover receiving means 36 comprises a groove adapted to frictionally engage engagement means 38 of cover 40 (shown in FIGS. 4 and 5). The engaging means 38 of cover 40 preferably comprises a downward projection extending about the internal periphery of the cover 40.

In addition, the top 12 of the box 10 includes an apertured flange 37 extending inwardly thereof. The flange 37 may receive a threaded insert to accommodate a bolt etc. (not shown) which may extend through a suitably dimensioned aperture in the cover 40 for connection therewith.

Figure 6:
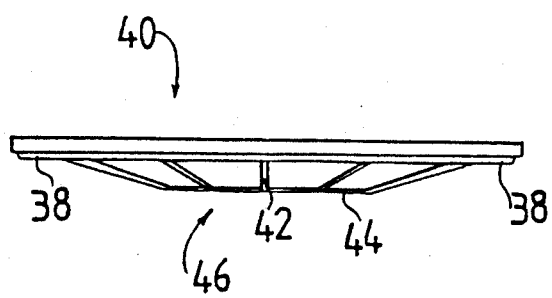
FIG. 6 is a side view of FIG. 4.

The cover 40 comprises a similar material as the box 10 and additionally includes integrally molded reinforcing means 42 extending radially from the center of the cover 40. An annular reinforcement 44 is provided intermediate of the periphery and center of the cover 40. The central portion 46 of the cover 40 is preferably frustoconical as illustrated in FIG. 6.

Applicant, by incorporating the reinforcing means 42 and 44 has found that the circular cover 40, while positioned on box 10, substantially dissipates any weight placed thereon by distribution to the periphery thereof. This, in turn, applies equivalent downward force to all areas of the box. Thus, the cover 40 effectively releasably engages the receiving means 36 of the box 10 to provide a re-enterable, non-electroconductive junction box 10, which can receive conduits, etc. from a plurality of angles and levels.

Although various embodiments have been described herein, it will be understood that various modifications can be made to the above-described embodiments without departing from the spirit and scope of the invention.

I claim:

1. In a junction box for connection of one or more electrical members, the improvement wherein said junction box comprises a hollow circular body, having an open top, said body having a plurality of circular tiers, said tiers comprising a plurality of diverging stages, each of said tiers having a cross-sectional area greater than a preceding stage and less than a succeeding stage; an inwardly extending support member extending circumferentially within said open top, said support member including an annular recess in an upper surface, a circular cover for positioning in said open top on said support member to close said open top, said cover including annular means for engagement in said annular recess and also including radially extending reinforcement means, said radially extending reinforcement means dissipating weight on said cover by distribution of said weight to the periphery thereof, and subsequently to the body.

2. The junction box as defined in claim 1, wherein said junction box includes means for mounting said box to a substrate, said mounting means extending outwardly from said junction box body.

3. The junction box as defined in claim 2, further including an outer circumferential wall, said mounting means extending outwardly and concentrically from a bottom tier of said box.

4. The junction box as defined in claim 3, wherein said circumferential wall includes a base member.

5. The junction box as defined in claim 4, wherein said base member includes first engaging means projecting therefrom and spaced apart second engaging means and said first engaging means being adapted for reception in respective second and first engaging means of a similar bar member of a similar structure thereby interengaging said junction box with a similar junction box when said boxes are in superposed relation.

6. The junction box as defined in claim 1, wherein said junction box body includes a circular wall, said circular wall including spacer means for spacing said wall from a bottom tier.

7. The junction box as defined in claim 6, wherein said spacer means comprises a plurality of individual spaced apart members.

8. The junction box as defined in claim 7, wherein said spaced apart members radiate laterally from said bottom tier.

9. The junction box as defined in claim 8, wherein said spaced apart members extend between said circumferential walls and said bottom tier.

10. The junction box as defined in claim 1, wherein each of said tiers includes reinforcing means.

11. The junction box as defined in claim 1, wherein said reinforcing means are integrally molded with said cover member.

12. The junction box as defined in claim 11, wherein said reinforcing means are annular reinforcing means spaced inwardly from said periphery of said cover member.

13. The junction box as defined in claim 11, wherein said reinforcing means comprise radially oriented reinforcing means radiating from a central portion of said cover member.

14. The junction box as defined in claim 1, wherein said cover member is frustoconical in profile.

15. The junction box as defined in claim 1, wherein said cover member comprises a polymeric material.

16. The junction box as defined in claim 1, wherein said cover member comprises a non-electroconductive material.

17. The junction box as defined in claim 1, wherein said cover member comprises a molded polymeric material.

18. A multi-tiered electrical junction box having a body defining a chamber therein, said body having an open top and an open bottom, said body having a plurality of spaced apart circular tiers forming diverging stages in said body, each of said circular tiers having a cross-sectional area greater than a preceding stage and less than a succeeding stage to thereby form a tiered internal and external configuration; mounting means for mounting said box to a substrate, said mounting means extending outwardly and concentrically from at least one of said tiers to permit said body to be secured to a substrate; an inwardly extending support member extending circumferentially within said open top, said support member including an annular recess in an upper surface, a circular cover for positioning in said open top on said support member to close said open top, said cover including annular means for engagement in said annular recess and also including radially extending reinforcement means, said radially extending reinforcement means dissipating weight on said cover by distribution of said weight to the periphery thereof, and subsequently to the body.

19. The junction box as defined in claim 18, wherein said mounting is L-shaped in cross-section.

20. The junction box as defined in claim 18, wherein said junction box comprises a rigid material.

21. The junction box as defined in claim 18, wherein said junction box comprises a non-electroconductive material.

22. The junction box as defined in claim 18, wherein said junction box comprises a polymeric material.

23. The junction box as defined in claim 18, wherein said junction box comprises a molded polymeric material.

* * * * *